Jan. 11, 1966   M. A. SCHWEIKER ETAL   3,228,660
BLENDING APPARATUS AND METHOD, ESPECIALLY FOR TILES
Filed Nov. 13, 1963                          12 Sheets-Sheet 1

INVENTORS:
MALCOLM A. SCHWEIKER
WAYNE C. WATSON
Howson & Howson
ATTYS.

Jan. 11, 1966   M. A. SCHWEIKER ETAL   3,228,660
BLENDING APPARATUS AND METHOD, ESPECIALLY FOR TILES
Filed Nov. 13, 1963   12 Sheets-Sheet 3

FIG.6.

INVENTORS:
MALCOLM A. SCHWEIKER
WAYNE C. WATSON
Howson & Howson
ATTYS.

INVENTORS:
MALCOLM A. SCHWEIKER
WAYNE C. WATSON

ATTYS.

Jan. 11, 1966   M. A. SCHWEIKER ETAL   3,228,660
BLENDING APPARATUS AND METHOD, ESPECIALLY FOR TILES
Filed Nov. 13, 1963   12 Sheets-Sheet 7

INVENTORS:
MALCOLM A. SCHWEIKER
WAYNE C. WATSON

Howson & Howson
ATTYS.

Jan. 11, 1966  M. A. SCHWEIKER ETAL  3,228,660
BLENDING APPARATUS AND METHOD, ESPECIALLY FOR TILES
Filed Nov. 13, 1963  12 Sheets-Sheet 9

INVENTORS:
MALCOLM A. SCHWEIKER
WAYNE C. WATSON

Howson & Howson
ATTYS.

Jan. 11, 1966 M. A. SCHWEIKER ETAL 3,228,660
BLENDING APPARATUS AND METHOD, ESPECIALLY FOR TILES
Filed Nov. 13, 1963 12 Sheets-Sheet 10

INVENTORS:
MALCOLM A. SCHWEIKER
WAYNE C. WATSON

Howson & Howson
ATTYS.

United States Patent Office
3,228,660
Patented Jan. 11, 1966

3,228,660
BLENDING APPARATUS AND METHOD,
ESPECIALLY FOR TILES
Malcolm A. Schweiker, Worcester, and Wayne C. Watson, Ambler, Pa., assignors to American Olean Tile Company, Inc., Lansdale, Pa., a corporation of New York
Filed Nov. 13, 1963, Ser. No. 323,522
9 Claims. (Cl. 259—3)

This invention relates to blending apparatus and method, especially for tiles, and has for an object the provision of improvements in this art.

In the tiling art it is frequently desirable to provide a random pattern of different types or lots of tiles, commonly of different colors, and the present invention provides means and method for preparing the desired blend in the desired percentages automatically. Since the tiles which are to be blended are commonly all of the same size and weight it is practicable to blend them by weight and that is the arrangement provided herein.

In the specific environment to be considered herein the blending apparatus supplies a mixture or blend of different types or lots—colors, specifically—of tiles to a plant or organization of apparatus which assembles them in sheets of tiles held together by a backing sheet, as of paper, which can be removed after the sheets of tiles have been set in cement.

A plant for assembling and applying a backing sheet to tiles is disclosed in the application of Wayne C. Watson, S.N. 246,120, filed December 20, 1962, and assigned to a common assignee.

That part of the whole plant which is adapted to receive a supply of mixed or blended tiles from the present apparatus and deposit them in the pockets of compartmented trays is disclosed in the copending application of Malcolm A. Schweiker, S.N. 225,578, filed September 24, 1962, and assigned to a common assignee.

One of the specific objects of the invention is to provide means and method for accurately weighing each of a plurality of lots or types of tiles together with means and method for quickly changing the quantity of any one of the lots or types of tiles supplied.

Another object is to provide means for supplying tiles to each of the lot weighing devices, together with means for stopping the supply or feed when a predetermined quantity has been supplied to the weighing device and for starting the supply or feed after the weighing device has been emptied.

Another object is to provide means for dumping all of a plurality of weighing devices simultaneously at a predetermined time after all of the weighing devices have received their allotted weights of tiles.

Another object is to provide controlled means for conveying the several lots of tiles to a mixing device.

Another object is to provide improved means for mixing the titles and delivering them to the tile arranging means.

The above and other objects of the invention as well as various novel features and advantages will be apparent from the following description of an exemplary embodiment thereof, reference being made to the accompanying drawings, wherein:

FIG. 2 is an enlarged plan view of the tile blending apparatus, shown at the left end of FIG. 1, with which the present invention is especially concerned, the view being taken in the area 2—2 of FIG. 1;

FIG. 3 is a partial transverse elevation and section taken on the line 3—3 of FIG. 2;

FIG. 5b (on sheet 2) is a partial vertical section taken on the line 5b—5b of FIG. 5a;

FIG. 5c is a vertical section taken on the line 5c—5c of FIG. 5b;

Figure 1:
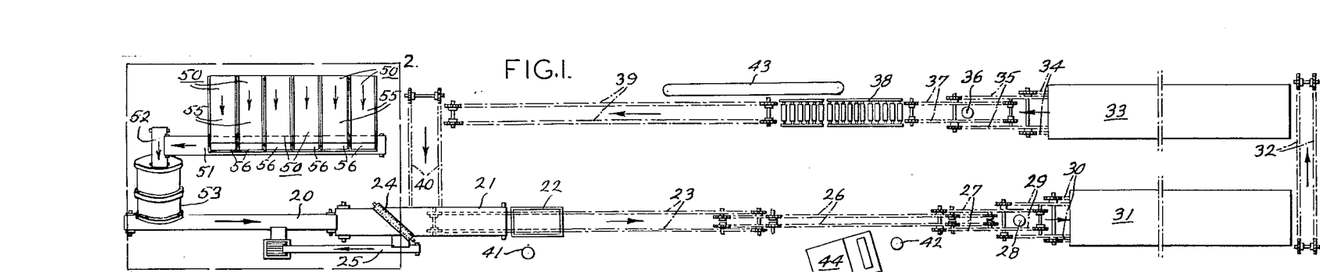
FIG. 1 is a plan view of a complete plant layout of apparatus for blending, assembling, backing, drying and unloading trays of tiles and delivering empty trays back into the line for refilling.

As disclosed in the later-filed application referred to above and as shown in FIG. 1, a belt feed conveyor 20 takes tiles in random arrangement and feeds them to an assembling device 21 which aligns them in rows and feeds them into the pockets of boards or trays 22 which, for example, have twenty-four spaces longitudinally and twelve spaces transversely or a total of 288 spaces for small tiles, for example $15/16''$ x $15/16''$ x $1/4''$ and commonly referred to as 1 x 1 tiles; which boards travel on a forwarding chain conveyor 23. Excess tiles are swept off by an oblique brush 24 to a return belt conveyor 25 which replaces them on the conveyor 20.

From the conveyor 23 the filled trays or boards 22 pass to a conveyor 26 where they are precisely arranged in the pockets of the boards and where, after rearrangement, an adherent backing sheet is applied to the backs of the tiles.

Up to this point the boards travel endwise. After the backing sheet has been applied, a low level conveyor 27 carries the boards, still travelling endwise, to a turntable 28 which first raises them above a wide-gage high-level conveyor 29, then gives them a quarter turn (90°), then lowers them down upon the conveyor 29 for sidewise travel to a conveyor 30 which carries them sidewise and closer together at a slower speed through a heated drying chamber or oven 31.

A cross conveyor 32 carries the boards from the oven 31 to a cooling chamber 33 through which they are carried by a conveyor 34. A wide-gage high-level conveyor 35 carries the boards from the cooling chamber 33 to a turntable 36 which raises them, gives them a quarter turn, then lowers them down upon a narrow-gage conveyor 37 which moves them endwise and spaced apart to a roller table conveyor 38.

On the roller table conveyor 38 the boards can accumulate and are pushed along by hand to a return belt conveyor 39.

The boards are transferred, as required by the forwarding chain conveyor 23, from the return conveyor 39 to the conveyor 23 by a return cross conveyor 40.

The operations are largely automatic but operators may be used at an inspection station 41, a backing sheet applying station 42, and a delivery station 43. A paper supply and glue-applying stand 44 may be provided for the operator at station 42.

The apparatus provided by the present invention prepares a mixture or blend of different lots or types (as colors) of tiles and feeds them to the infeed conveyor 20. Still referring to FIG. 1 for a general survey of operations, there are a plurality of proportional tile feeders 50, six as shown, which supply predetermined quantities of tiles, by weight specifically, to a collecting transfer belt conveyor 51 which feeds all of the tiles of a given batch or dump to a cross conveyor 52 which deposits them in a power operated mixer or blender 53 which, in turn, after mixing them thoroughly, supplies them to the conveyor 20.

Figure 6:
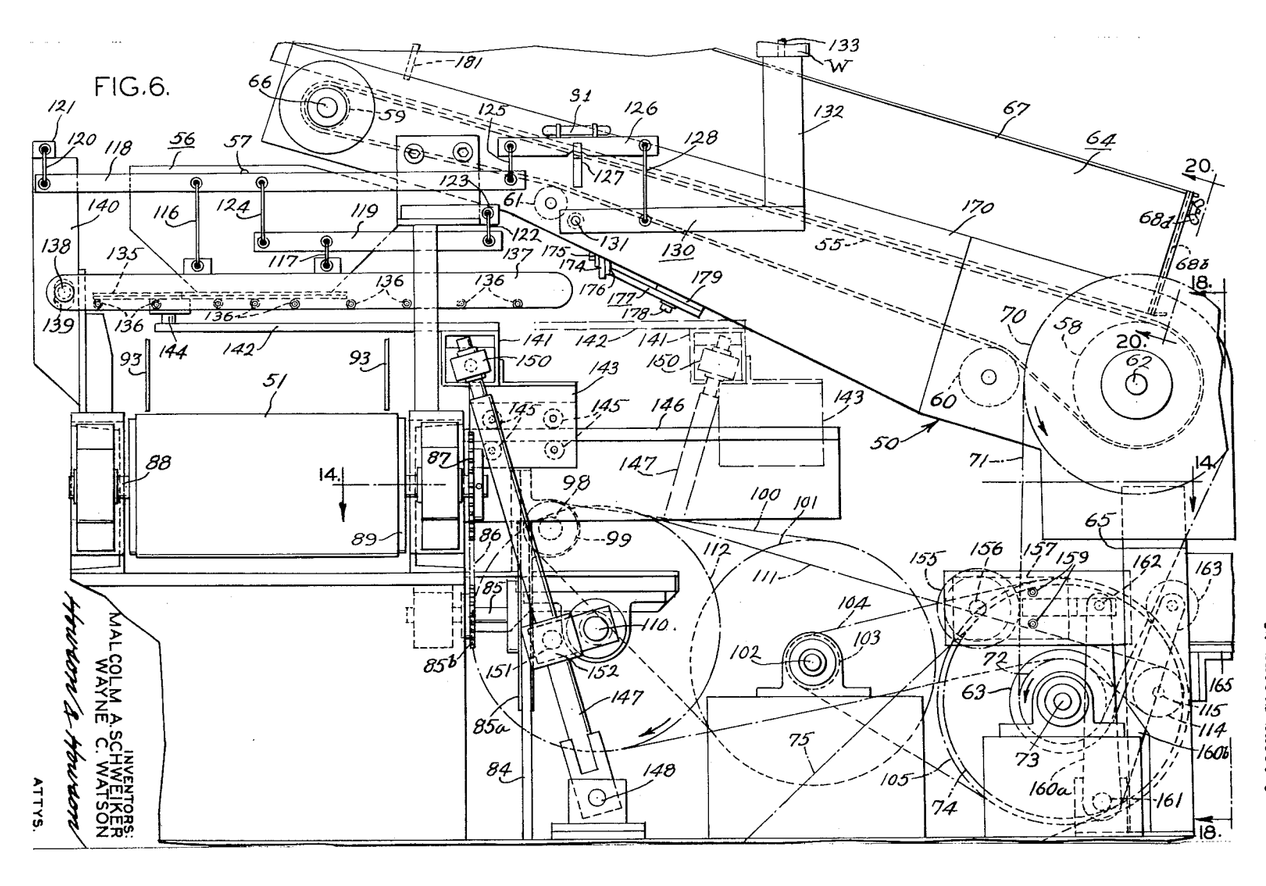
FIG. 6 is an enlarged partial transverse elevation taken on the line 6—6 of FIG. 2.

As shown in FIG. 6, each of the proportional feeding devices 50 includes an upwardly inclined belt feed conveyor 55 which has tiles of a selected type (a specific color for each conveyor, for example) fed in to its lower end by suitable means, not shown, and which delivers tiles off its upper end into a weighing hopper 56. The hopper has transverse strands 57 at its top to break the fall of the tiles to minimize chipping and breakage of them. The conveyor belt 55 travels over a drive pulley or pulleys 58 at its lower end, over a pulley or pulleys 59 at its upper end, and over intermediate idler pulleys 60 and 61. The lower-end pulleys are mounted on a drive shaft 62 which is controllably driven, as by a solenoid controlled clutch 63. The upper run or span of the conveyor belt 55 operates in a trough 64 carried, with the shafts and other parts, on a framework which is generally designated by the numeral 65. The pulley 59 is an idler and turns on a shaft 66 mounted on the frame. The trough 64 has inclined sides 67 which keep the tiles away from the edges of the conveyor belt.

As shown in FIGS. 6 and 20-22, the lower end of the trough 64 has an end wall 68 for retaining tiles to be elevated, the end wall having a bottom opening 68a normally closed by a gate 68b movable in vertical guides 68c and held in position by bolts 68d in slots 68e.

Figures 2, 3, 5B, 5C:
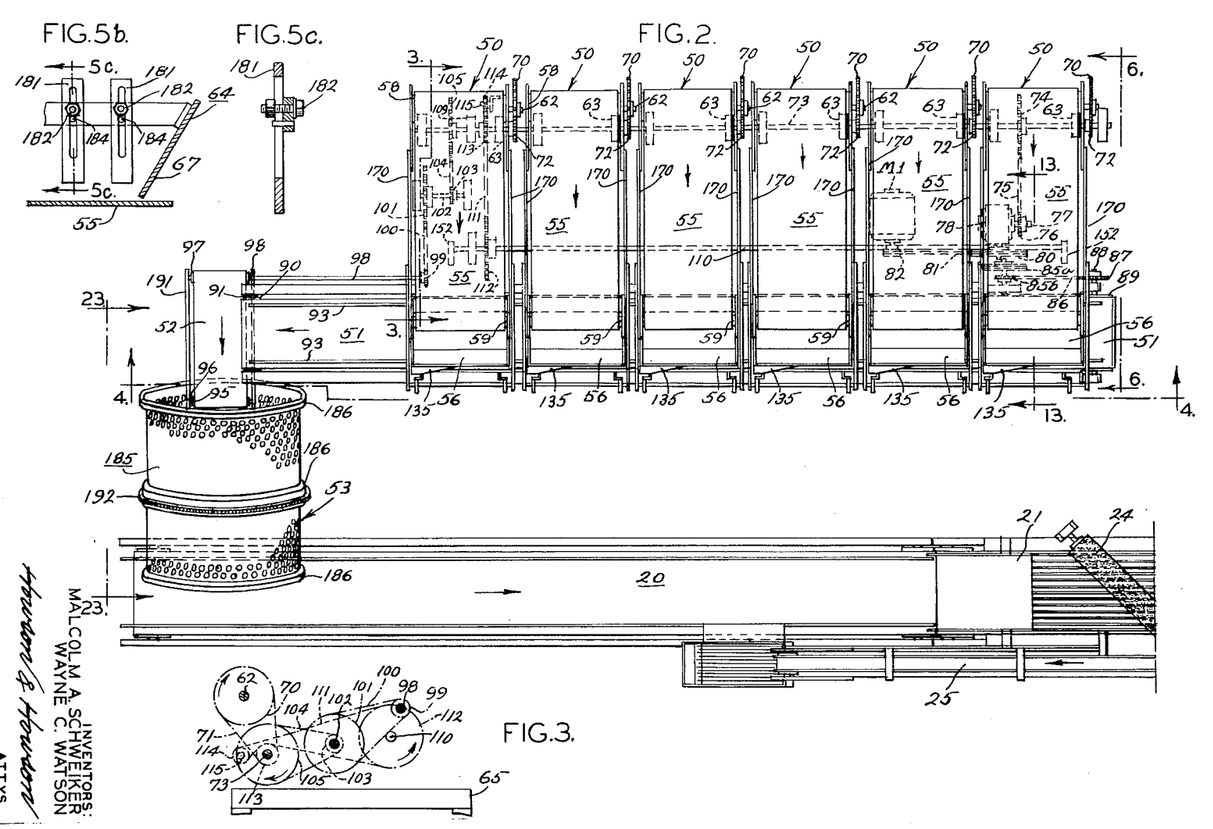
Figure 14:
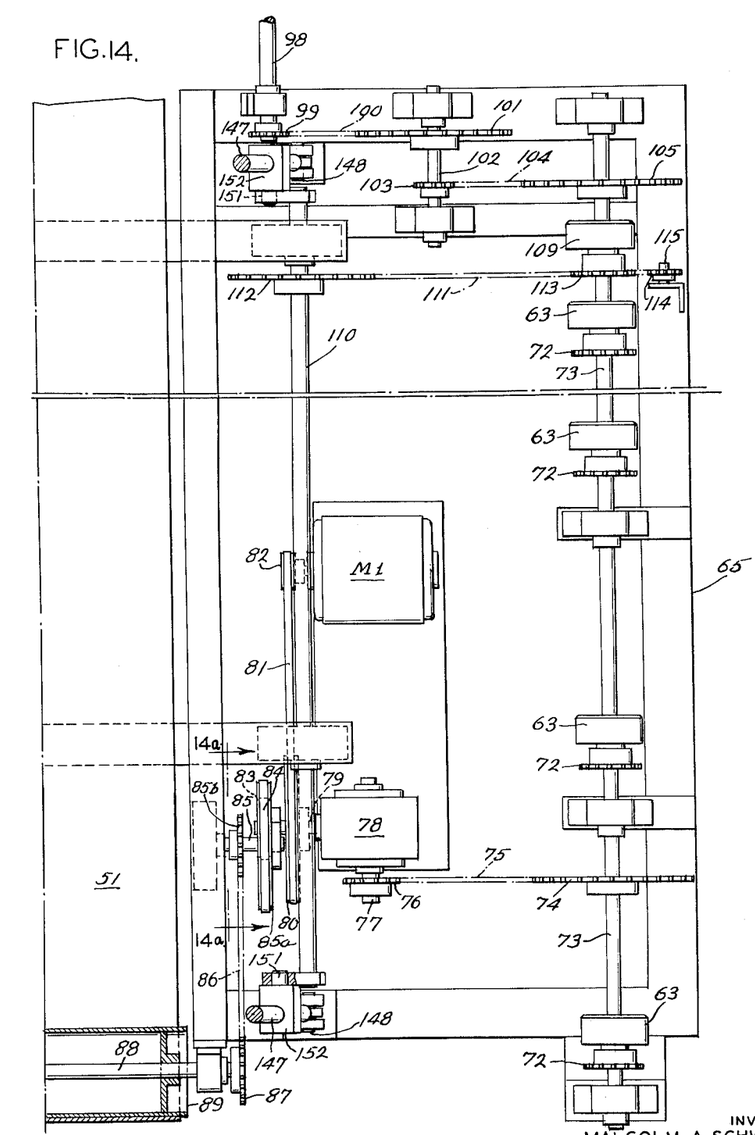
FIG. 14 is an enlarged horizontal section taken on the line 14—14 of FIG. 6.

Referring to FIGS. 2 and 3, the shaft 62 for each conveyor belt 55 is provided with a sprocket 70 driven by a sprocket chain 71 from a sprocket 72 carried on a long drive shaft 73. Toward the right end (FIG. 14) the shaft 73 is provided with a sprocket 74 which is driven by a sprocket chain 75 from the sprocket 76 of a shaft 77 of a gear box 78. The clutches 63 for the feed conveyors 55 are mounted on the drive shaft 73. A shaft 79 of the gear box 78 has a pulley 80 which is driven by a belt 81 from a pulley 82 of the shaft of a motor M1.

Figure 4:
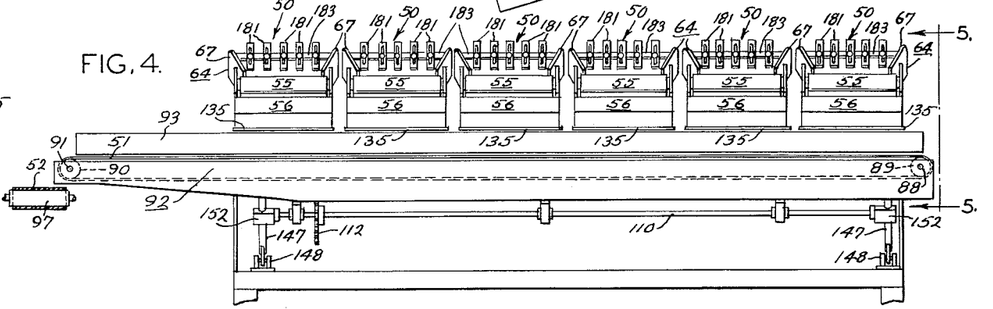
FIG. 4 (on sheet 1) is a longitudinal elevation, partly in section, taken on the line 4—4 of FIG. 2.
Figure 5:
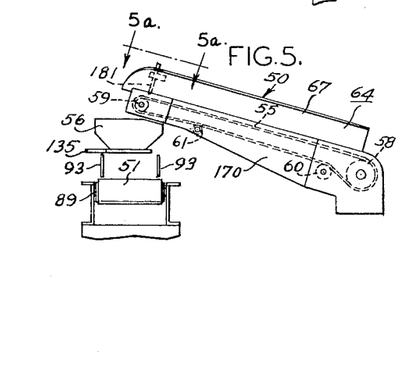
FIG. 5 (on sheet 1) is a partial transverse section and elevation taken on the line 5—5 of FIG. 4.
Figure 5A:
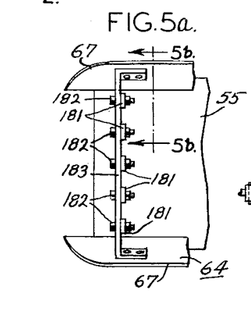
FIG. 5a is an enlarged generally horizontal view taken on the line 5a—5a of FIG. 5.

The shaft 79 (FIG. 14a) also has a pulley 83 which drives a belt 84 and through it drives a pulley 85a of a lay shaft 85. The shaft 85 carries a sprocket 85b which drives a sprocket chain 86 and through it drives a sprocket 87 of a shaft 88 which carries a pulley or pulleys 89 which supports and drives the collecting conveyor belt 51. At the other end the conveyor belt 51 is carried on a pulley or pulleys 90 of a shaft 91. Intermediate its ends the belt 51 is supported on suitable rollers or a table or both, generally denoted by the numeral 92 in FIG. 4. The belt is provided with side boards 93 for retaining the tiles on the belt.

Again referring to FIGS. 2 and 3, the crossover belt 52 is supported on an idler pulley 95 carried by a shaft 96 and a drive pulley 97 carried by a driven shaft 98. The shaft 98 has a sprocket 99 which is driven by a sprocket chain 100 from the sprocket 101 of a lay shaft 102 which, in turn, has a sprocket 103 driven by a sprocket chain 104 from a sprocket 105 carried on the drive shaft 73.

The shaft 73 also drives a hopper dump shaft 110 through a sprocket chain 111 passing over a sprocket 112 on the dump shaft 110, over a sprocket 113 on the shaft 73, and over an idler sprocket 114 carried by a shaft 115. A clutch 109 on the drive shaft 73 controls the operations of the dump shaft 110.

Figures 7, 8, 9, 10, 11, 12:
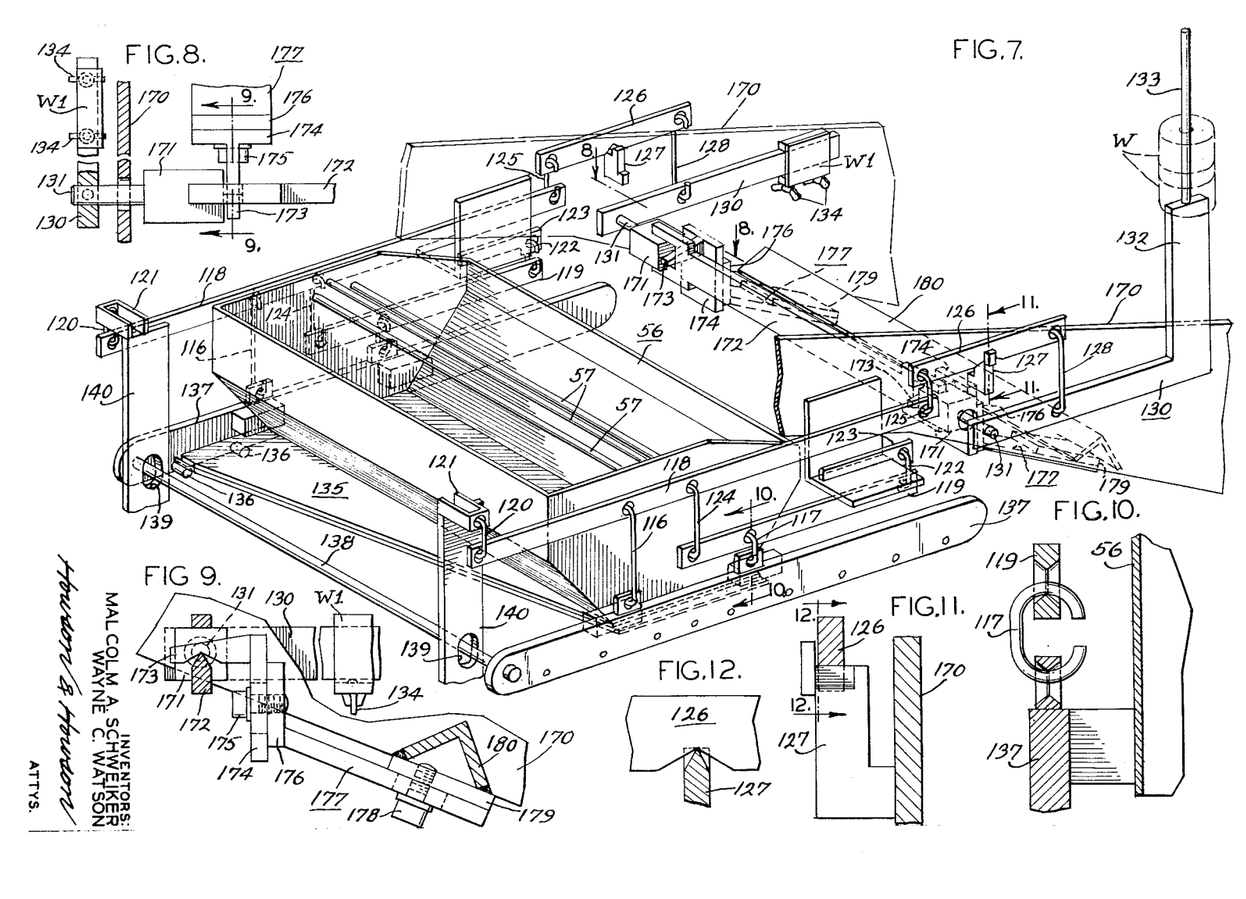
FIG. 7 is an enlarged perspective view of the weighing hopper mechanism shown in FIG. 6, part of the related mechanisms being cut away for clarity.
FIG. 8 is an enlarged horizontal section taken on the line 8—8 of FIG. 7.
FIG. 9 is a vertical transverse section taken on the line 9—9 of FIG. 8.
FIG. 10 is an enlarged vertical longitudinal section taken on the line 10—10 of FIG. 7.
FIG. 11 is an enlarged vertical longitudinal section taken on the line 11—11 of FIG. 7.
FIG. 12 is a vertical transverse section taken on the line 12—12 of FIG. 11.

As shown in FIGS. 6 and 7, the weighing hopper 56 for each of the several tile feeders 50 is supported in such manner that it can weigh accurately and so it can be dumped without getting its balance supports disarranged.

On each side of the hopper the supporting means is the same so the description will follow that of the one side which is illustrated.

Swing links 116 and 117 are pivoted at their lower ends to the hopper 56 at equal distances from the center and at the upper end are pivoted respectively to a high-level beam 118 and to a low-level beam 119. The high-level beam 118 has one end pivotally supported through a swinging link 120 to a fixed support 121; and the low-level beam 119 has one end pivotally supported through a swinging link 122 to a fixed support 123. The support points of the hopper supporting links 116 and 117 are located at equal distances from the ends of beams 118, 119 which are carried on fixed supports 121, 123 respectively.

Midway between the links 116 and 117 and at the mid-width of the hopper 56, the swinging end of the low-level beam 119 is pivotally connected to the high-level beam 118 by a swing link 124.

The swinging end of the high-level beam 118 is connected by a swing link 125 to one end of a balance beam 126 which is supported at its mid-length on a fixed knife-edge support 127. The other end of the balance beam 126 is pivotally connected by a swing link 128 to a weight beam 130 having one end supported on a fixed pivot 131. The outer swinging end of at least one of the two weight beams 130 is provided with a fixed weight post 132 and an upstanding weight-carrying post 133 which together almost balance the weight of the hopper (both sides combined if the same on both sides) and apertured weights W may be dropped on one or both of the posts to approximately equal as a total the weight of tiles which are to be fed into the hopper. As shown in FIGS. 7 and 8, only one of the weight beams carries the weights W, the other carrying a slidable weight W1 which provides the fine balance. It is held in position by clamp screws 134. A switch device S1 is mounted on the balance beam 126 to provide a control signal when the predetermined desired weight of tiles has been fed into the hopper.

The bottom opening of each hopper 56 is provided with a sliding closure or gate 135 mounted in guideways which are in part formed by supporting rollers 136 of guide bars 137 which are secured to the sides of the hopper. The front ends of the guide bars 137 are loosely connected, as by a connecting rod 138 in oversized holes 139 in fixed frame parts 140, to resist lateral forces required to move the closure back and forth without restricting the necessary limited vertical movements of the weighing hopper 56. The top surface of the closure 135 is covered with rubber or plastic to cushion the fall of tiles and avoid abrasion of the closure.

Figures 14A, 15, 16:
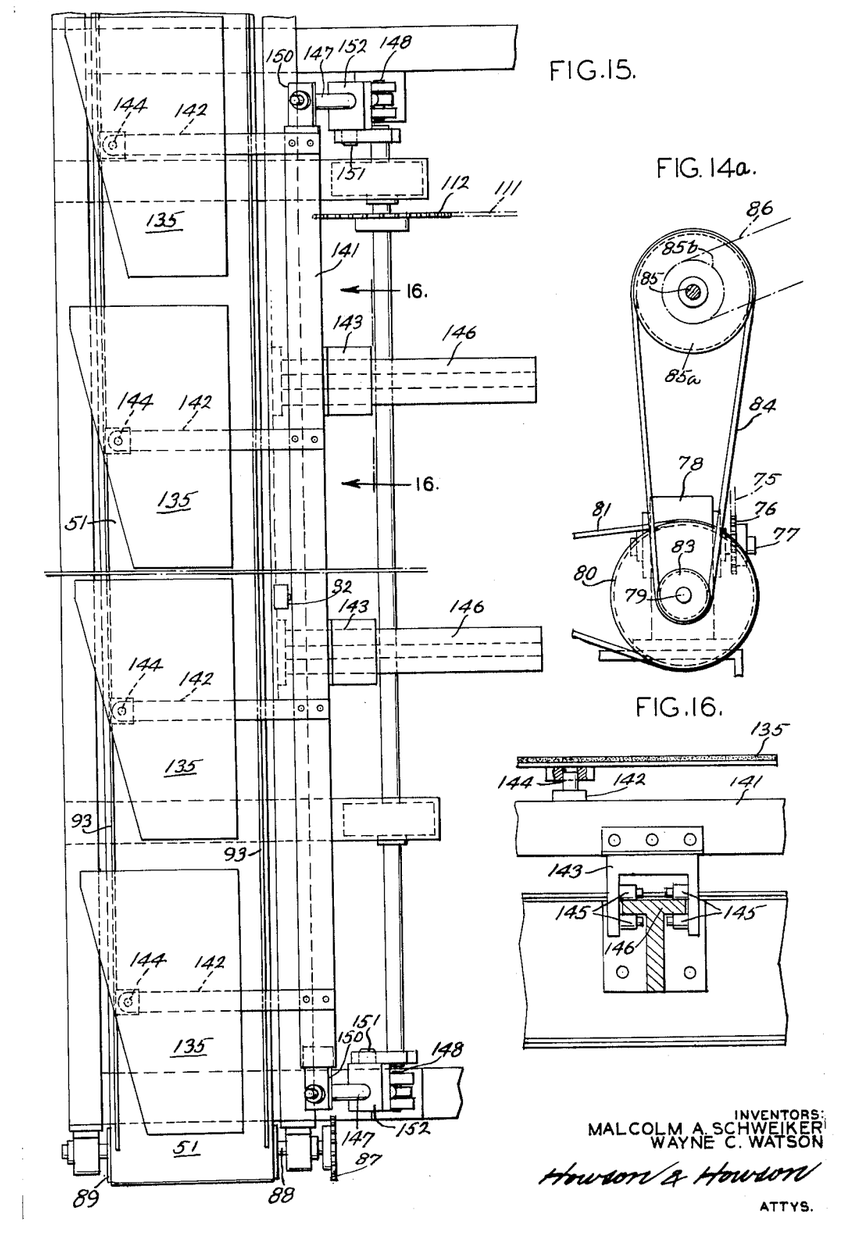
FIG. 14a (on sheet 7) is a vertical longitudinal section taken on the line 14a—14a of FIG. 14.
FIG. 15 is a horizontal section taken on the line 15—15 of FIG. 13.
FIG. 16 is a vertical longitudinal section taken on the line 16—16 of FIG. 15.
Figure 17:
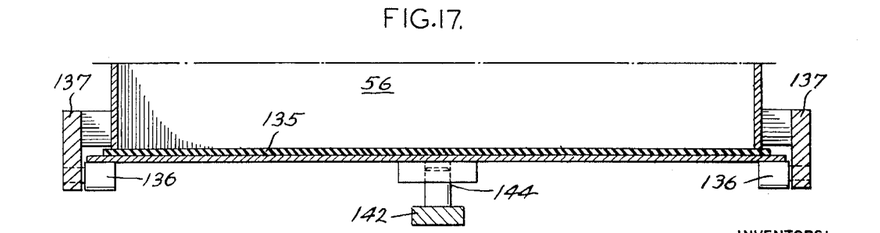
FIG. 17 (on sheet 5) is a vertical longitudinal section taken on the line 17—17 of FIG. 13.

Means are provided for reciprocating the closure 135 without restricting its sliding movement and without influencing the free suspension and accurate weighing functions of the hopper. The means herein shown comprises a connecting link 142 mounted on a longitudinal beam 141 which at spaced intervals along its length is secured to reciprocatory slide carriages 143 and connected to the closure 135 (FIG. 16) by a pin and hole connection 144 which provides sliding movement without imposing any weight on the closure and hopper. The forward edge of the closure 135 is oblique, as shown in FIG. 15, to start the discharge of tiles gradually.

Figure 13:
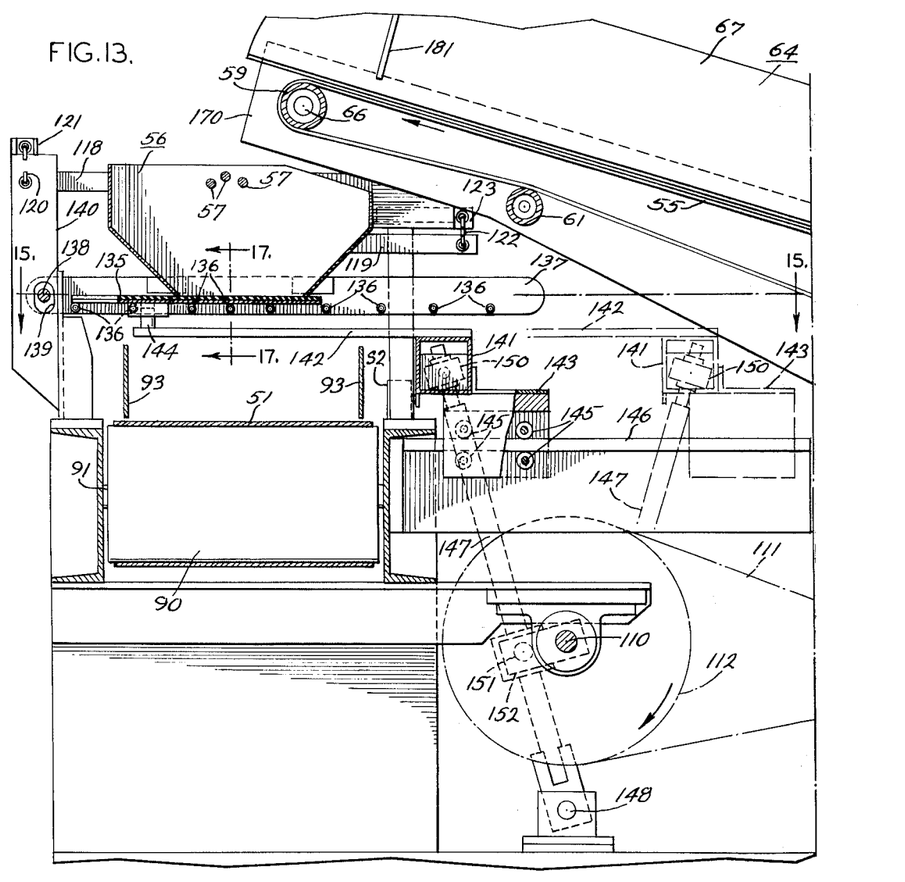
FIG. 13 is a partial enlarged vertical transverse section taken on the line 13—13 of FIG. 2.

The carriages 143 are provided with rollers 145 movable along guide rails 146 secured to the main framework. As shown in FIG. 13, the ends of the beam 141 are each pivotally connected to and reciprocated by a swinging arm 147 mounted at its lower end on a fixed pivot pin 148 and having a pin and slide connection, generally indicated by the numeral 150, with the end of the beam. The swinging arm is operated by a crank pin 151 and a slide connection 152 from the hopper dump shaft 110 previously referred to.

In FIG. 13 the position of the beam 141 for the closed position of the closure 135 is shown in full lines and for the open position is shown in broken lines. It will be noted that the closure is opened when the crank pin 151 is above the axis of the operating shaft 110 where it is furthest from the turning axis of the arm 147 and where a large angular movement of the crank pin will produce relatively small angular movement of the arm, hence the opening movement of the closure will be relatively slow. When the crank pin is below the axis of the shaft during the closing travel of the closure it will produce relatively fast closing movement.

Means are provided for holding the feed belt conveyors 55 against reverse movement due to the weight of tiles on them when they are de-clutched after each batch of tiles has been fed to the hopper. The anti-reverse mechanism is arranged so that it may be de-activated when it is desired to open the bottom end gate of the feed belt trough to remove tiles therefrom, as when closing down or changing types of tiles to be fed.

Figure 18:
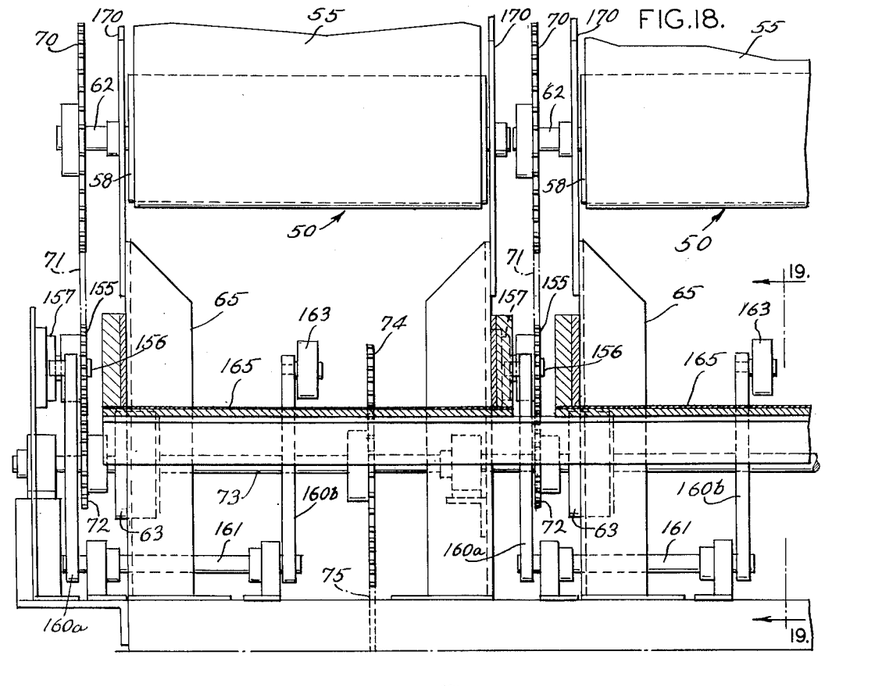
FIG. 18 is a vertical longitudinal section taken on the line 18—18 of FIG. 6.
Figures 19, 19A:
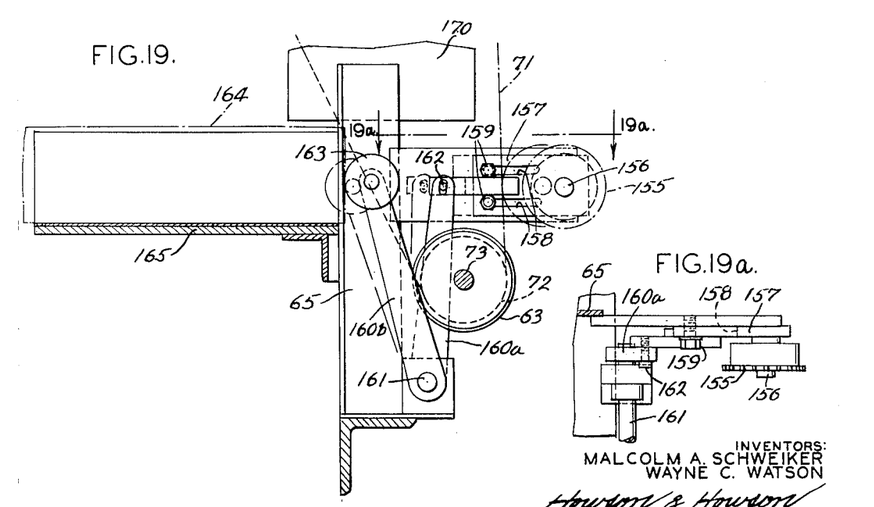
FIG. 19 is a vertical transverse section taken on the line 19—19 of FIG. 18 but with parts shown in a different position for removing tiles from the feed conveyor trough.
FIG. 19a is a horizontal section taken on the line 19a—19a of FIG. 19.
Figure 20:
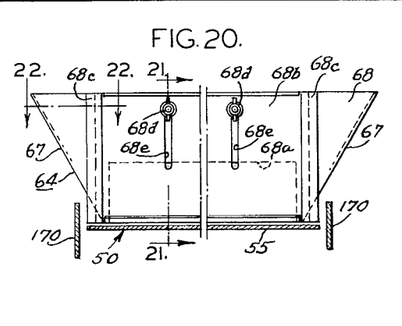
FIG. 20 (on sheet 1) is a vertical longitudinal section taken on the line 20—20 of FIG. 6.
Figures 21, 22:
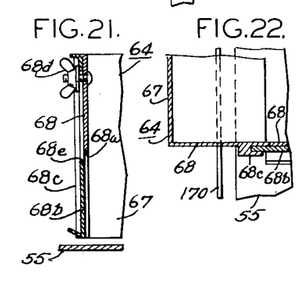
FIG. 21 (on sheet 1) is a vertical transverse section taken on the line 21—21 of FIG. 20.
FIG. 22 (on sheet 1) is a partial horizontal section taken on the line 22—22 of FIG. 20.
Figures 23, 24:
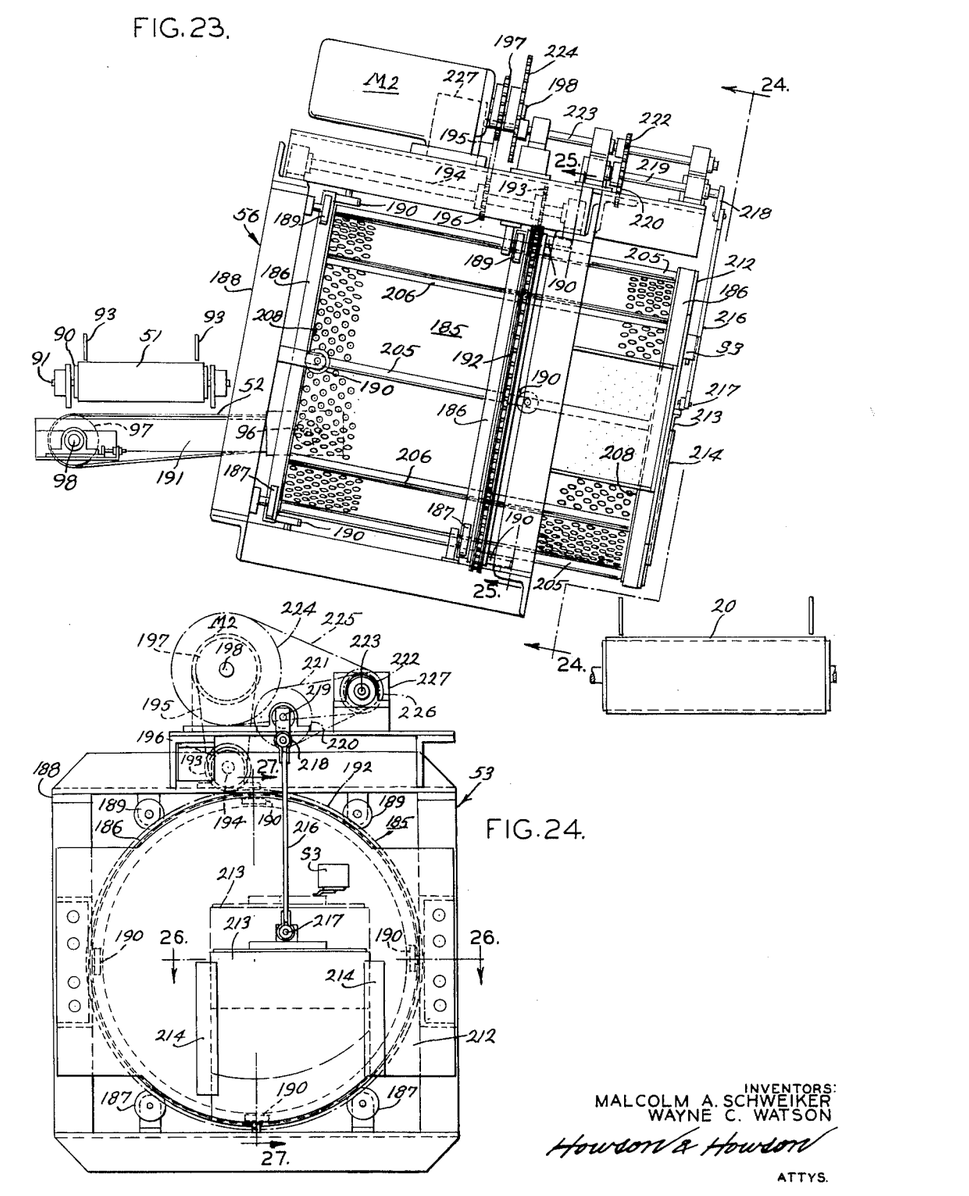
FIG. 23 is an enlarged left end elevation taken on the line 23—23 of FIG. 2.
FIG. 24 is a longitudinal elevation taken on the line 24—24 of FIG. 23.

This mechanism is shown particularly in FIGS. 18, 19 and 19a. A sprocket 155 carried by a shaft 156 on a slide 157 has an overrunning clutch device carried in its hub so that it can turn only in one direction. The slide 157 has slots 158 slidably mounted on clamp cap screws 159 in such manner that the sprocket 155 can be brought into mesh with the sprocket chain 71 which drives the feed belt conveyor. When so engaged, the sprocket 155 will allow the sprocket chain 71 to move only in the direction to cause the feed belt conveyor to feed tiles to the weighing hopper. In this position the cap screws 159 can be tightened to hold the overrunning clutch sprocket 155 securely in mesh with the sprocket chain 71. If desired, the sprocket 155 may be resiliently urged into engagement with the sprocket chain 71.

Means are provided for disengaging the sprocket 155 from the sprocket chain 71 when the tiles are to be removed from the trough. As shown, a lever 160a is pivoted on a shaft 161 mounted on the frame, the lever having a slot embracing a pin 162 on the slide and the shaft 161 carrying another arm 160b provided with a roller 163 which is adapted to be engaged by the side of a box 164 on a shelf 165 when the box is pushed in to receive tiles. At this time the gate 68b is pushed up and if necessary the feed belt 55 is turned reversely to move tiles down into the box, the movement being permitted because the belt drive clutch 63 and the anti-reverse-drive clutch sprocket 155 are both disengaged. If the cap screws 159 had been tightened for running they would be loosened to permit the slide to move during dumping; if a spring urges the sprocket toward meshing position and the weight of the box on its shelf does not produce sufficient friction to hold the sprocket clear of the chain, the cap screws can be tightened to hold it clear. Except for axial spacing, the arms 160a, 160b fast on the shaft 161 act as a bellcrank and may be so designated.

Some details of the hopper scale beam mountings are shown in FIGS. 7 to 12. These will all be clear from the above description except for the mounting of the fixed end support for the weight beams 130. From FIGS. 8 and 9 it will be seen that the reaction of the beams is upward; and to provide knife-edge support here the pins 131 secured to the levers 130 pass through oversized holes in the supporting frame members 170 and interiorly are secured to blocks 171 which, in turn, are secured to a bar 172 having a knife edge located exactly on the axis of the pins 131.

The knife edges of the bar 172 engage relatively fixed supports 173 which, however, are arranged to have vertical and lateral adjustment. Each support 173 is carried by a plate 174 having slots embracing cap screws 175 threaded into the upstanding end 176 of a bracket plate 177 which has slots embracing cap screws 178 threaded into a plate 179 which is carried by a transverse bar beam 180 welded at its ends to the frame members 170.

As shown in FIG. 13, the closure 135 has associated with it a limit switch device S2 to control the action of its operating mechanism, as will be more fully explained in connection with the wiring diagram.

Means are provided for smoothing the flow of tiles from the feed belt conveyors 55 to the scale hoppers and for preventing too many tiles being fed at one time. As shown in FIGS. 4, 5, 5a, 5b and 5c, this flow smoothing means comprises a plurality of laterally spaced slotted bars 181 secured by cap screws 182 to a transverse supporting beam 183 which at its ends is secured, as by welding, to the side plates 67 of a trough. A guide pin 184 in a slot holds the bar in vertical position. The bars are adjusted vertically to leave a space at the lower end of the proper size to secure the rate of flow desired.

The tile mixing or blending device 53 is shown in detail in FIGS. 23 to 28. It has already been explained that the blender receives tiles from the cross conveyor 52 and, after mixing them, delivers them to the conveyor 20 of the tile arranging mechanism.

The blender 53 comprises a drum 185 mounted on an inclined axis (about 10°) and provided with means for supporting and rotating it about its axis. The body of the drum is foraminous but with openings smaller than full-size tiles and large enough to drop out broken tiles of less than half size and scrap. The drum is lined interiorly (FIGS. 25 and 26) with rubber to minimize injury to tiles and abrasion to the cylinder. Annular track rings or bands 186 of the drum are supported on trunnion rolls 187 carried by a frame 188. The frame also carries top guide rolls 189 and end guide rolls 190.

Figure 25:
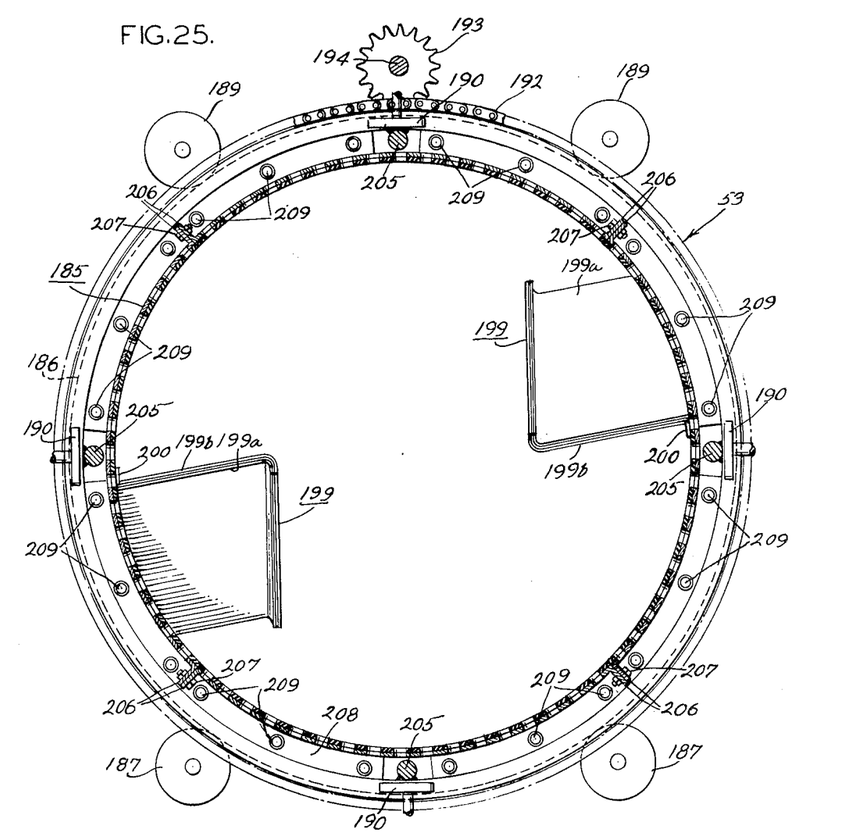
FIG. 25 is an enlarged vertical longitudinal section taken on the line 25—25 of FIG. 23.
Figure 26:
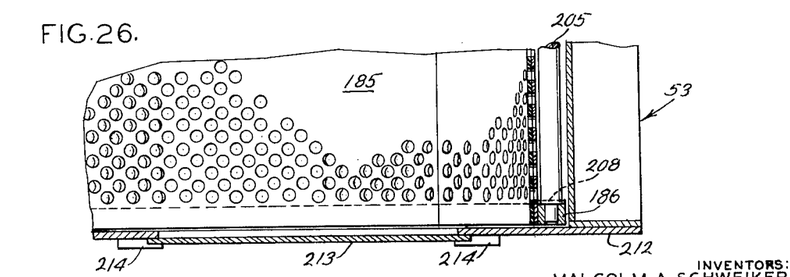
FIG. 26 is a partial enlarged horizontal section taken on the line 26—26 of FIG. 24.

The belt 52 which feeds tiles to the drum is mounted on a cantilever frame 191 so that its delivery end is located inside the upper open end of the drum. The drum is enclosed by an outer casing but this has been largely omitted for clarity.

The drum is driven through a gear 192 of the chain type secured thereon and is driven by a drive gear 193 of the sprocket type carried by a drive shaft 194 mounted in suitable bearings on the frame. The shaft 194 is driven by a sprocket chain 195 passing over a sprocket 196 on the shaft and over a sprocket 197 of a shaft 198 of a motor M2 secured on the frame.

Figure 27:
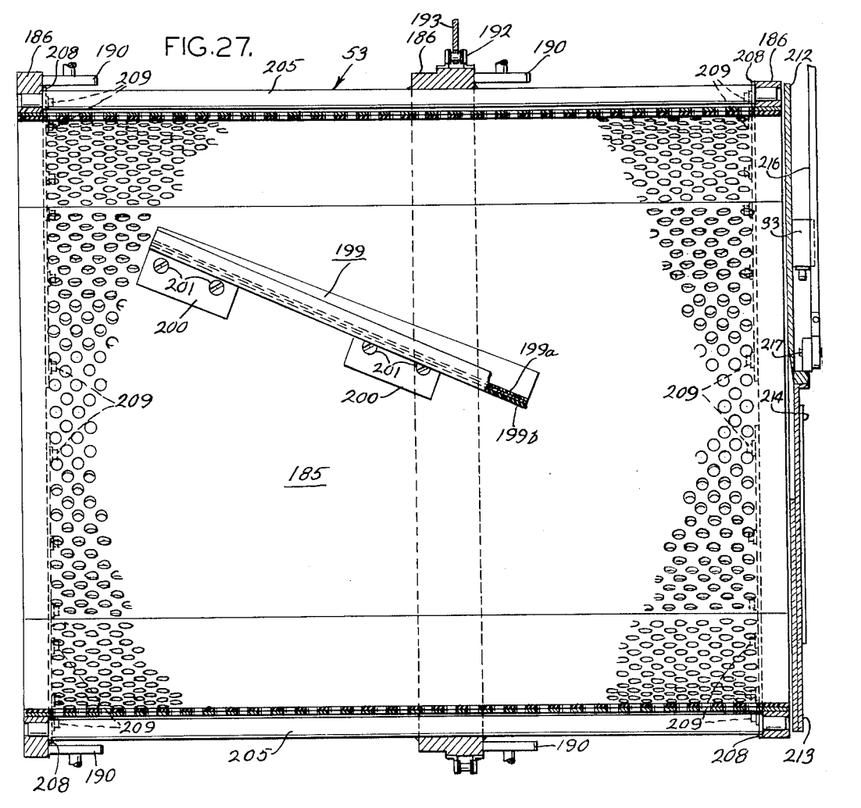
FIG. 27 is an enlarged vertical transverse section taken on the line 27—27 of FIG. 24.
Figure 28:
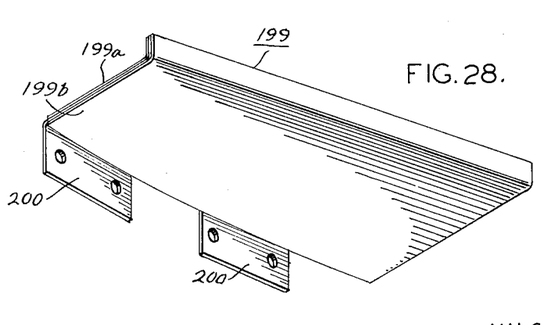
FIG. 28 is a perspective view of a lifter plate or vane shown in FIG. 27.

Interiorly the durm is provided with one or more vanes or blades 199 which lift and drop tiles gently to mix them as the drum rotates. As shown in FIG. 27, the plates 199 are lined on the lifting side with a material having a low coefficient of friction, such as a polymerized fluorocarbon known as "Teflon" 199a, so the tiles can slip off readily and are lined on the other side with rubber 199b. The interior body of the plates is a strong material like metal and the plates are provided with bent flanges 200 which are secured to the inside of the drum, as by bolts 201.

The foraminous lining of the drum 185 is arranged to be removable. For this purpose the outer portion of the drum is made as a rigid self-sustaining cage comprising the trunnion rail bends or rings 186 and longitudinal ribs 205 rigidly secured thereto, as by welding. Although the lower end rail band does not ride on trunnions it is made rigid to form a part of the cage. The lining is made in a plurality of segments with external longitudinal flanges 206 which are secured together by bolts 207. At the ends there are secured to the metal sheet of the shell—which is outermost—radial flanges 208 which are secured to the rail bands or rings, as by cap screws 209.

At the lower end of the drum there is secured a fixed closure plate 212 which closely overlies the end of the drum but is not connected thereto. This closure plate is provided with a bottom opening which can be covered by a vertically movable closure or gate 213 operable in guides 214 secured to the closure plate 212. Means are provided for operating the gate 213 at desired times to close it during a predetermined adjustable mixing period, say one-half minute to one minute, and to open it after the mixing period to allow the rotating drum to discharge tiles down upon the conveyor belt 20.

The means here shown for operating the gate 213 comprises a connecting rod 216 pivoted by a pin 217 at its lower end to the gate and connected at its upper end to a crank pin 218 of a shaft 219 mounted in bearings at the top of the drum frame 188. The shaft 219 has a sprocket 220 driven by a sprocket chain 221 from a sprocket 222 on a clutch shaft 223 mounted in suitable bearings on the frame. The shaft 198 of motor M2 has a sprocket 224 which drives a sprocket chain 225 and through it drives a sprocket 226 of a clutch device 227 which is adapted to connect and disconnect the sprocket 227 with the shaft 223 at desired times to lower and raise the gate. A limit switch device S3 is provided for actuation by the gate 213 at the upper end of its stroke as will be explained in connection with the wiring diagram. The clutch used may be of the type known as a Hilliard clutch.

During an operating period the motors M1 and M2 operate continuously to continuously operate the drive shaft 73, the belt conveyor 51, the belt conveyor 52, and the drum 53. Other parts are under control of clutches switches, timing mechanism and the like.

The operation of the plant will be explained in connection with the wiring diagram of FIG. 29. It has already been explained that the main drive shaft 73 runs continuously to drive the collecting conveyor 51 and the mixer fed conveyor 52 continuously; that the mixer drum turns continuously; and that the take-off conveyor 20 runs continuously.

A power supply, such as 110 volt A.C. is provided by way of lines L1, L2. A timer T1, which may be of the type known as A.T.C. timer #306, is provided for setting the length of operating cycles so the supply of blended tiles will match the needs of the tile arranging apparatus (FIG. 1) which is supplied thereby. The T1 closes a connection in a line when a scale hopper loading operation is to be initiated and opens this line when sufficient time has been allowed for loading and dumping the hoppers. Specifically it opens the line during the dumping period, which is sufficiently long to provide adequate latitude for opening the line at the timer early enough to avoid recycling the feed conveyors until the next cycle.

Lines L3 and L4 branch off from main lines L1, L2 ahead of the timer T1; lines L5, L6 extend from a connecting switch in the timer to the feeders 50; and lines L7, L8 extend from the lines L3 and L4 to the mixer or blender 53.

The scale switch device S1 has two contact switches, S1a which is normally closed when the hopper is empty and opened when the weight is made; and S1b which is normally open and closed when the weight is made.

The hopper gate switch device S2 has two contact switches, S2a which is normally closed when the gate is closed and which opens as soon as the gate leaves the closed position; and S2b which is normally open and which is closed as soon as the gate leaves the closed position.

The mixer gate switch device S3 has two contact switches, S3a which is normally closed when the gate is in the normal lower position and which opens when the gate reaches the top position; and S3b which is normally open when the gate is in the lower position and which closes when the gate reaches the top position.

Also associated with the gate of the mixer is an air controlled timer T2 with adjustment control means which determines the length of time required for the timer coil T2–C to shift its contact switches T2–C1 and T2–C2 after the coil has been energized and thus to determine how long the gate is held closed for mixing before it is opened for dumping tiles from the drum. The contact switch T2–C1 is normally closed (when the coil T2–C is de-energized) and is opened at the predetermined set delay time after the coil T2–C has been energized. As will be seen, the coil T2–C is energized after the scale hopper gates have re-closed after dumping. The other contact switch T2–C2 is normally open and is closed when the companion switch T2–C1 is opened.

The clutch device 227, referred to as a Hilliard clutch, requires separate energization for each gate operating action, one for raising the gate and another for closing the gate. Only the coil 227c of the clutch is shown in FIG. 29. After it is raised, the gate shifts the position of the contact switches S3a and S3b but the clutch will not be energized to close the gate until the coil T2–C has been de-energized to close its contact switch T2–C1 and this will not occur until a new cycle is initiated—which provides ample time for tiles to be discharged from the drum before the drum gate is re-closed.

When the timer T1 operates to initiate a cycle it closes a switch between lines L5 and L6. Line L5 connects with a line L9 which serves all of the feeding devices 50 in parallel through the normally closed switches S1a of the hopper scales and lines L10 to the solenoid relay coils C1 of the feed devices.

Figure 29:
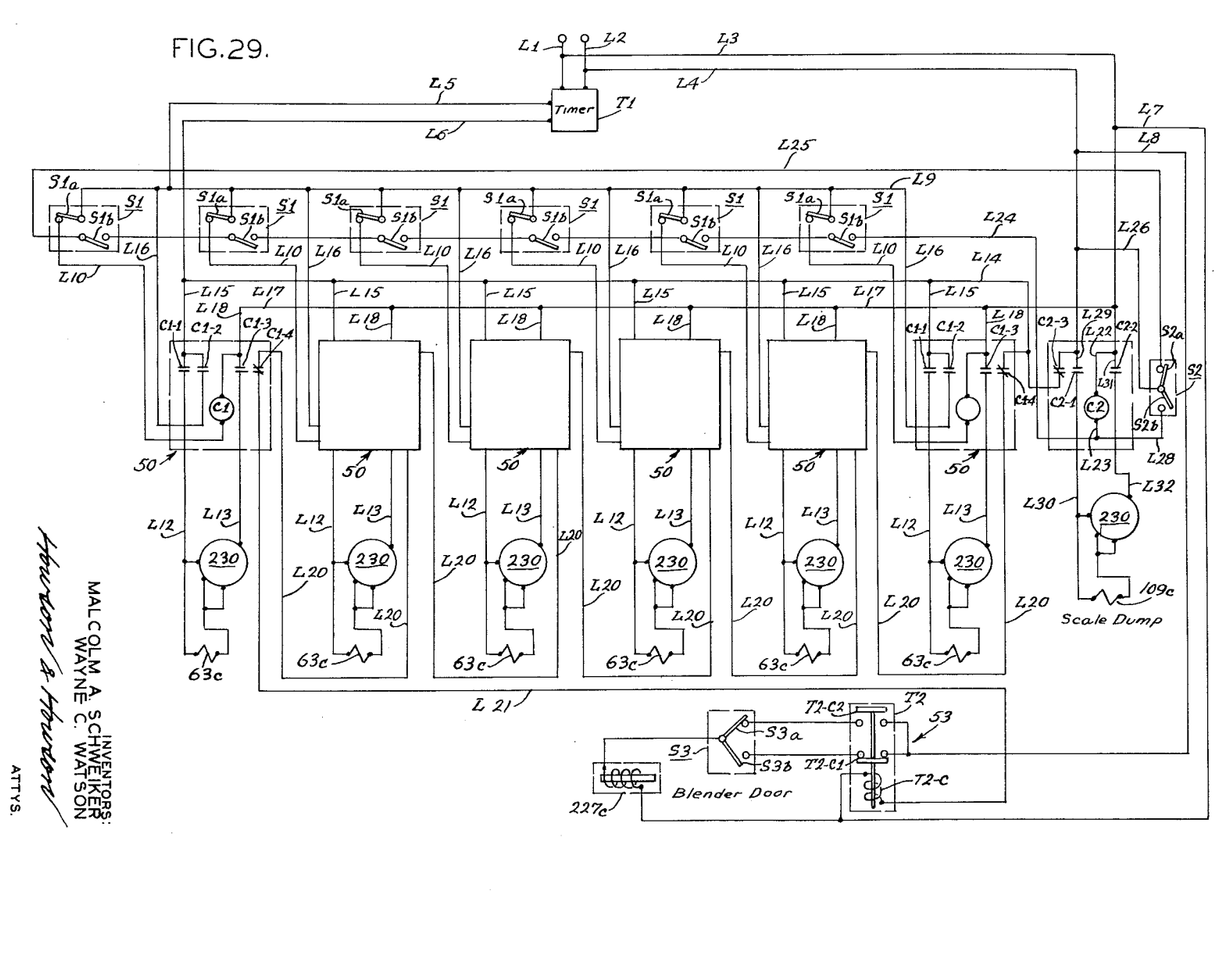
FIG. 29 is a wiring diagram.

The clutch 63 of the drive for each feed belt conveyor is represented in FIG. 29 by its coil, designated by the number 63c. This solenoid coil 63c is supplied with rectified current, say 90 volts D.C., by a rectifier 230 served by lines L12 and L13. Line L6 which connects with a line L14 which serves all of the feed devices in parallel through lines L15 leading to two relay switches to be described. Line L9 has branch lines L16 leading to one of these same switches. A line L17 which branches from the line L3 is connected to the other side of the relay coils C1 by parallel branch lines L18.

Each of the relay coils C1 has three normally open switches C1–1, C1–2, C1–3 which it closes when the coil is energized; and also has one normally closed interlock switch C1–4 which it opens when the coil is energized.

The switch C1–1 connects between lines L15 and L12, to supply current to one side of the rectifier 230 and clutch coil 63c; line L16 connects to L15 through C1–2; and the switch C1–3 connects between lines L18 and L13 to supply current to the other side of the rectifier and clutch coil. Lines L15 and L16 are in shunt with scale switch S1a to assure that the clutch coil 63c is not operated through the scale switch.

The switches C1–4 of all feeders connect in series in a loop line L20 which also has in series a similar switch C2–3 of the scale hopper dump clutch circuit to line L4; and after the last switch C1–4 a line L21 leads to the coil T2–C of the mixer run timer T2.

The line L14 extends through C2–3 to L4.

The circuit for the mechanism which operates the clutch 109 of the shaft 110 which dumps all of the scale hoppers simultaneously after all of the hoppers have been filled is shown at the right-hand side of FIG. 29. Here it is seen that a branch line L22 connected to line L3 supplies current to one side of a solenoid relay coil C2 which controls the dumping operations. The other side of the coil C2 is supplied with current from a line L23 and a line L24 which includes in series all of the switches S1b of the hoppers of all the feeders; and a line L25 from the last of these switches S1b extends through the switch S2a of the gate opener beam and back through line L26 to line L4.

This arrangement assures that the hoppers cannot be dumped until the last of all of them has made its weight.

The line L23 from the coil C2 also has connected to it a line L28 which passes through the other switch S2b which is closed when the gates have started to open. Switch S2b, like switch S2a, connects by way of line L26 to line L4. By this arrangement the relay coil C2 locks in on switch S2b when the hopper gates are opened and switches S1b re-opened to assure continued operation until the gates are closed and then to stop the operation when C2b is opened.

The relay coil C2 when energized, causes closure of its normally open switches C2–1 and C2–2. The switch C2–1 connects a branch line L29 of line L4 with a line L30 to one side of the rectifier 230 of clutch solenoid coil 109c; and the switch C2–2 connects a branch line L31 from line L3 with a line L32 to the other side of the rectifier 230 and clutch coil 109c.

A normally closed interlock switch C2–3 in the loop line L20 of the timer T2, previously mentioned, is opened and held open until the dumping is complete so that the timer T2 cannot begin timing the mixing cycle until the dumping of all scale hoppers has been completed and the dump gates reclosed. Since the switch C2–3 is also in series with the line L14 which leads to line L6 to the timer switch, it is also assured that the feed conveyors cannot be re-activated until after the hopper gates have been re-closed and by this time the timer switch has been opened.

When the timer T1 connects the lines L5, L6 the coils C1 are all energized and start all of the feed belts 55 into operation to feed tiles to all of the hoppers. The interlock loop circuit L4, C2–3, C1–4 (all), L20, L21, T2–C, L7, L3 previously will have been closed to keep the timer coil T2–C energized to hold its switch T2–C1 open. The gate of the drum will have been raised to close the limit switch S3b after the previous cycle but since the switch T2–C1 in the line S3b is held open, the clutch coil 227c remains de-energized and the Hilliard clutch does not lower the gate. However, as soon as the relay coils C1 are energized the normally closed switches C1–4 are opened and the coil T2–C is de-energized to close the switch T2–C1 to cause the gate to be closed.

Energization of all the relay coils C1 closes all of the switches C1–1, C1–2 and C1–3 and energizes all of the feed belt conveyor clutch coils 63c to feed tiles to the scale hoppers 56. As each hopper makes the predetermined weight for which it is set the scale switch device S1 will open its switch S1–a and close its switch S1–b. This will de-energize the coil C1 and open the switches C1–1, C1–2 and C1–3 and thus de-energize the clutch coil 63c to stop the feed.

When all of the switches S1b in the line L24 are closed the circuit through relay C2 will be closed, the gate-closed limit switch S2a being closed. As soon as the gates leave closed position the limit switch S2a will be opened; but the companion limit switch S2b will be closed to lock in the coil C2 on L3, L22, L23, L28, S2b, L26, L4 to cause the gate operating cycle to be completed (open and close all gates) and the switch S2b opened again to stop the action.

As soon as the hoppers begin to dump tiles the scale switches S1b will be opened and the switches S1a re-closed ready for the next operation.

After the dumping cycle has been completed and the coil C2 de-energized to re-close the switch C2–3 in the line L20 (all of the other series switches C1–4 in the line having been closed before the start of dumping) the coil T2–C will be energized to start the timing of the mixing cycle. Due to the predetermined pre-set time delay of the timer T2 the switches T2–C1 and T2–C2 will not be shifted from their normal position (T2–C1 closed and T2–C2 open) until the end of the predetermined time period and the drum gate will remain closed during the mixing period thus provided.

The remainder of the drum gate operating cycle has already been traced through.

The timer T1 is so set that it will de-energize the lines L5 and L6 after all scale hoppers have made their weight and at some time thereafter before the dump gates have been reclosed and the switch C2–3 re-closed.

Switch C2–3 has a dual function. Its open condition during dumping assures that no current can reach the main timer switch before it opens; and its subsequent closed condition initiates the mixer timing cycle. The result of having the switch C2–3 open during dumping is that the main timer is provided enough time to open its switch before the dumping is completed and C2–3 re-closed, which assures that the feed conveyors cannot be re-started until the beginning of the next cycle; the result of holding C2–3 open until dumping has been completed is that the tiles will have time to reach the mixer while its gate is closed and before the gate-opening timer starts to time out the mixing period.

It is thus seen that the invention provides improved blending apparatus and method which is very effective and efficient; which assures dependable coordination of all operating components; which provides an even flow of tiles; which minimizes the damage to tiles; which overlaps tiles of different types on the collecting conveyor; which prevents reverse movement of the feed conveyors when de-clutched; which provides release of the feed conveyors for reverse movement for emptying; and which in other ways provides improvements in this art.

While one embodiment of the invention has been described for purposes of illustration, it is to be understood that there may be various embodiments and modifications within the general scope of the invention.

We claim:

1. Blending apparatus, comprising in combination, a plurality of weighing devices, a feeder for each of said weighing devices, separate drive means for each of said feeders, a continuously operating collecting conveyor means for receiving material from all of said weighing devices, means for halting the drive of each feeder when it makes its weight on its weighing device, a dumping device for dumping all of said weighing devices on said collecting conveyor means when all of them have made their weight, a continuously operating mixing device arranged to receive material from said collecting conveyor means, a closure for said mixing device arranged to close during a mixing period and open after the mixing period to discharge material, interlocking control means for starting said dumping device after all of said weighing devices have made their weight, closure operating means for opening and closing the closure of said mixing device, an adjustable mixer timer for timing the action of said closure operating means, interlocking control means for starting said mixer timer into timing action after all of said weighing devices have been dumped and said dumping device has completed its dumping operation, and a time-responsive timing device for starting said feeders into operation to start a new cycle of operation at a selectable time after all of said weighing devices have been dumped.

2. Apparatus as set forth in claim 1 which includes means in said second interlocking control means which keeps said mixer closure open until said time-responsive timing device starts a new cycle of operations and then closes it.

3. Blending apparatus, comprising in combination, a rotary inclined mixing drum, means for feeding a plurality of materials to be blended into said drum, a discharge opening in a stationary end closing wall for the lower end of the drum and at the bottom side of the drum, a vertically movable closure for said opening, and operating means for said closure which places it in closed position before a charge of material is fed into the drum, said closure operating means including a settable timer which opens the closure after a predetermined period of operation of the drum.

4. Blending apparatus for tiles, comprising in combination, a rotary tile mixing drum, means for feeding batches of tiles to be mixed into the drum, and means for discharging batches of mixed tiles from the drum, said drum including a foraminous shell lined interiorly with a shock absorbing material, said shell having interior inclined vanes lined on the forward side with a low friction plastic such as a polymerized fluorocarbon, and lined on the trailing side with rubber.

5. The method of blending tiles of different types to produce a random pattern, comprising in combination: feeding tiles of different types to a plurality of scale hoppers, stopping the feed of tiles when each scale hopper makes the predetermined weight for which it is set, dumping the tiles from all of the hoppers upon a moving belt conveyor after all of the hoppers have made their weights, transporting the dumped tiles to a mixer, mixing the tiles thoroughly in the mixer, and delivering the mixed tiles from the mixer to be arranged into sheets of tiles.

6. The method as set forth in claim 5, which further comprises: timing the start of a batch mixing cycle by starting the feeding of tiles to the weighing hoppers at predetermined selectable time intervals as required for the time needed for arranging the tiles.

7. The method as set forth in claim 5, which further comprises: timing the start of action of the feeding means for each batch to be blended, starting the feed to all scale hoppers simultaneously, stopping the feed to each hopper when it makes its weight, starting the dump from all hoppers simultaneously after all have made their weight, starting a selectable timing period for mixing the tiles after the scale hoppers have all been dumped and their dumping elements re-closed, and discharging tiles from the mixer when the selected mixing time has expired.

8. The method of blending tiles, comprising in combination: running a common drive means for a plurality of tile feed conveyors continuously, connecting all of the feed conveyors to the drive means simultaneously at the start of a mixing cycle, feeding tiles by said feed conveyors into scale hoppers with bottom dump gates, stopping each feed conveyor when its scale hopper makes its weight, running collection conveyor means continuously, running a mixing drum continuously, dumping tiles from all of said scale hoppers gradually and simultaneously on said conveyor means to overlap to some extent thereon, feeding tiles by said conveyor means to said mixing drum, holding said tiles in said drum for a selectable predetermined period, and after said mixing period discharging the mixed tiles from said drum.

9. The method as set forth in claim 8, and in which said feed conveyors are held out of operation while said scale hoppers are being dumped, and re-starting said feed conveyors at the demand of a clock timer after the expiration of a predetermined settable time period.

References Cited by the Examiner

UNITED STATES PATENTS

| | | | |
|---|---|---|---|
| 570,109 | 10/1896 | Smyser | 177—104 |
| 688,912 | 12/1901 | Watts | 198—44 |
| 694,565 | 3/1902 | Mason | 259—89 X |
| 1,066,656 | 8/1913 | Richardson | 177—104 |
| 1,852,764 | 4/1932 | Wentworth | 259—3 |
| 2,088,099 | 7/1937 | Uenable | 259—3 X |
| 2,187,079 | 1/1940 | Hannon | 259—89 |
| 2,619,218 | 11/1952 | Krehbiel | 198—44 |
| 2,797,070 | 6/1957 | Winn et al. | 259—3 |
| 2,858,594 | 11/1958 | Eirich et al. | 259—154 X |
| 2,930,595 | 3/1960 | Tarukawa | 259—154 X |
| 3,062,511 | 11/1962 | Gard | 259—3 |

FOREIGN PATENTS 502,347   3/1939   Great Britain.

WALTER A. SCHEEL, *Primary Examiner.*

LEO SMILOW, *Examiner.*

G. J. PORTER, J. M. BELL, *Assistant Examiners.*